UNITED STATES PATENT OFFICE.

GADIENT ENGI AND JAROSLAV FRÖHLICH, OF BASEL, SWITZERLAND, ASSIGNORS TO SOCIETY OF CHEMICAL INDUSTRY IN BASLE, OF BASEL, SWITZERLAND.

YELLOW-COLORED DERIVATIVES OF INDIGO AND PROCESS OF MAKING SAME.

994,988.   Specification of Letters Patent.   Patented June 13, 1911.

No Drawing.   Application filed December 28, 1910. Serial No. 599,724.

*To all whom it may concern:*

Be it known that we, GADIENT ENGI, doctor of philosophy and chemist, a citizen of the Swiss Republic, and JAROSLAV FRÖHLICH, doctor of philosophy and chemist, a subject of the Emperor of Austria-Hungary, residents of Basel, Switzerland, have invented new and useful Yellow-Colored Derivatives of Indigo and a Process of Making Same, of which the following is a full, clear, and exact specification.

According to the statements in literature, when indigo is heated with excess of benzoyl-chlorid it becomes dibenzoylindigo, which is an amorphous brown powder melting at 108° C. and can be reconverted into indigo by its treatment with a saponifying agent (compare *Beilstein* Vol. 2 page 1621).

According to the present invention by the action of halids of acids of the aromatic series or analogously acting substances, such as benzoyl chlorid or benzotrichlorid, on an indigo substance, in the presence of a condensing agent, hitherto unknown condensation products are obtained, which by treatment with saponifying agents are not capable of being reconverted into indigo.

The new condensation products show an intense yellow coloration and yield by their treatment with fuming sulfuric acid sulfo-acids which dye wool in an acid bath beautiful yellow tints.

The invention is illustrated by the following examples, the parts being by weight:

Example I: 10 parts of indigo, 100 parts of nitrobenzene, 40 parts of benzoyl chlorid and 1 part of copper powder are heated together for 2-3 hours at 150-160° C. while stirring well; the originally blue mixture gradually becomes red-brown. The mass is then allowed to cool, diluted with four times its weight of alcohol and allowed to rest for about 12 hours. The product of the reaction separates as a dark yellow crystalline powder which is filtered and washed with alcohol. By recrystallization from nitrobenzene, for example, this condensation product may be further purified and obtained as greenish yellow needles melting at 270-272° C. It is insoluble in water, sparingly soluble in alcohol and ligroin, and easily soluble in hot nitrobenzene to a yellow solution. The solution in concentrated sulfuric acid is deep brown and from it the original compound separates as yellow flocks on addition of water. Fuming sulfuric acid dissolves the condensation product to a yellow brown solution which becomes yellow when diluted with ice water and then dyes wool yellow. By treatment of the condensation product with alkaline reducing agents such as caustic soda lye and hydro-sulfite, a deep Bordeaux red solution is produced.

Example II: 10 parts of indigo, 100 parts of nitrobenzene, 40 parts of benzotrichlorid and 2 parts of copper powder are heated together in an oil bath while well stirring, in such a manner that the temperature of the oil bath rises to 135-145° C. in the course of one hour, and the mixture is then kept at this temperature for about 15 minutes, whereby the mass becomes brown. After complete cooling, the mixture is filtered and the separated crystals are washed several times with alcohol. By further purification by recrystallization from nitrobenzene, yellow crystals of melting point 240° C. are obtained; their behavior against solvents, fuming sulfuric acid and alkaline reducing agents is analogous to that of the product obtained according to Example I. In analogous manner condensation products may be made from homologues and substitution products of indigo.

Example III: 10 parts of dibromindigo, 50 parts of nitrobenzene, 40 parts of benzoyl chlorid and 1 part of copper powder are heated together in an oil bath so that the temperature of the latter rises in the course of about an hour to 170-180° C. This temperature is maintained, while continuously stirring, for 5-6 hours. After cooling the mass, the condensation product which has crystallized is filtered and washed with alcohol. In this manner greenish yellow crystals are obtained which melt at above 320° C.

The conditions of working laid down in the preceding examples may be varied within wide limits. Instead of copper other metals such as cobalt, mercury or nickel, or metal salts such as zinc chlorid or aluminium chlorid, may be used as condensing agent or contact substance. The nitrobenzene may also be omitted, or its place may be taken by other diluents or solvents, such as naphthalene or xylene. If instead of benzoyl chlorid or benzotrichlorid substitution products thereof be used, new condensation products of analogous properties are formed. The compounds manufactured according to the described process are to be employed as dyestuffs.

What we claim is:

1. The described process for the manufacture of new colored condensation products consisting in treating 1 mol. of an indigo substance with 1 mol. of a halid of an acid of the aromatic series, in the presence of a condensing agent, substantially as described.

2. The described process for the manufacture of a new colored condensation product consisting in treating 1 mol. of indigo with 1 mol. of benzoyl chlorid, in the presence of a condensing agent, substantially as described.

3. As new products, the described condensation products derived from an indigo substance forming in dry state greenish yellow to brownish yellow powders, insoluble in water, difficultly soluble in alcohol and ligroin, but easily soluble in hot nitrobenzene with a yellow color, yielding by treatment with alkaline reducing agents wine red solutions and dissolving in concentrated sulfuric acid with brown color and in fuming concentrated sulfuric acid to a brown solution becoming yellow when diluted with water and dyeing afterward wool yellow shades.

4. As a new article of manufacture, the described condensation product of indigo with benzoylchlorid, forming in dry state a yellow powder, insoluble in water, sparingly soluble in alcohol and ligroin, but easily soluble in hot nitrobenzene to a yellow solution, yielding by treatment with alkaline reducing agents a deep Bordeaux red solution and dissolving in concentrated sulfuric acid to a deep brown solution and in fusing concentrated sulfuric acid to a yellow brown solution becoming yellow when diluted with water and dyeing afterward wool yellow shades.

In witness whereof we have hereunto signed our names this 15th day of December 1910, in the presence of two subscribing witnesses.

GADIENT ENGI.
JAROSLAV FRÖHLICH.

Witnesses:
 GEO. GIFFORD,
 AMAND BRAUN.